D. ABLON.
LIQUID LEVEL ELECTRICAL INDICATOR.
APPLICATION FILED FEB. 26, 1915.

1,171,405.

Patented Feb. 15, 1916.

UNITED STATES PATENT OFFICE.

DAVE ABLON, OF DALLAS, TEXAS.

LIQUID-LEVEL ELECTRICAL INDICATOR.

1,171,405.  Specification of Letters Patent.  Patented Feb. 15, 1916.

Application filed February 26, 1915. Serial No. 10,841.

*To all whom it may concern:*

Be it known that I, DAVE ABLON, a citizen of the United States, residing at 2516 Caroline street, Dallas, in the county of Dallas and State of Texas, have invented certain new and useful Improvements in Liquid-Level Electrical Indicators, of which the following is a specification.

This invention relates to a new apparatus for indicating the surface level of liquids and is designated, in this instance, as a "liquid level electrical indicator."

A purpose of the invention is to provide an electrical apparatus properly correlated with a float, which float will remain on the surface of the liquid in the tank or reservoir, which will open and close a circuit, thereby causing a light to burn, or cutting off the light when the circuit is opened.

A feature of the invention is to provide such an apparatus which will vary the amount of current flowing to the light as the liquid rises or increases in depth in the tank or reservoir. The device is designed to cause the light to burn at maximum brightness or brilliancy when the liquid is at its lowest level, thereby attracting and indicating to one's attention the fact that the water supply or liquid level is very low or in fact exhausted. Then, as the water or liquid level begins to rise the light will gradually diminish in brightness till it finally goes out through the agency of a switch which opens the circuit when the liquid reaches its highest level.

Figure 1:
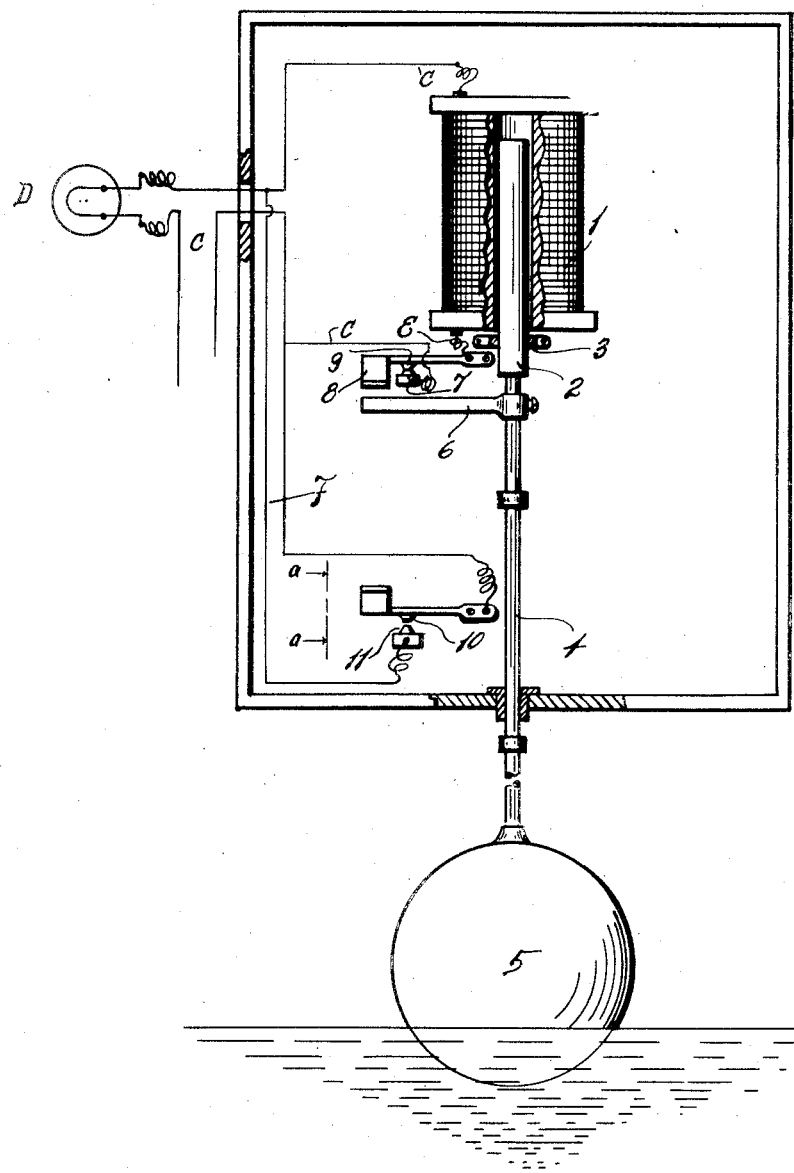
Figure 2:
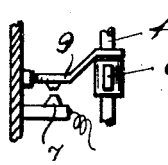

With these and other objects in view the invention relates to certain arrangements and combinations of parts, an example of which is described in this specification, pointed out in the appended claims and illustrated in the accompanying drawings where:

Figure 1 is a view of the invention placed in a box or housing and located in proximity to the liquid, the level of which is to be indicated. Fig. 2 is a view upon the section line *a—a* of Fig. 1.

Referring now more in particular to the drawings, where the same parts are designated by identical reference characters, the numeral 1 designates a solenoid secured to the wall of the casing which protects and supports the several elements here disclosed.

A sliding core 2 is provided and adapted to be retained by a guide 3 which adapts the core to properly pass into the hollow core of the solenoid. A substantially long rod 4 is connected with the core and extends through the housing and down to the water surface where it is provided with a float 5 which buoys itself upon the water surface. An insulated trip member 6 is adjustably carried by the rod and, as later seen, adapted to close and open switches which control the illumination of the light globe.

A contact point 7 forms one terminal of one electrical circuit C which in this instance may be provided with a source of alternating current for illuminating a light globe D included in the circuit. The other terminal of the circuit connects with the solenoid. As indicated by E the solenoid is connected with a switch member 8 which carries a contact point 9 adapted to contact the point 7. The contact points 7 and 9 normally engage causing the light D to burn, being in series circuit however with the solenoid.

A circuit F is provided and connects with the circuit just described. Contact points 10 and 11 are provided, forming the terminal of said circuit, and being similar to those previously described. Said circuit F is adapted to remain normally open, as illustrated, which keeps the solenoid in series with the light circuit.

The position of the float and height of the liquid surface is shown, approximately, at its maximum height. As the liquid continues to rise the trip member 6 will open the circuit C extinguishing the lights; which indicates that the water supply in the tank or liquid level is sufficient in height to shut off a pump or any factor which may be raising the liquid level. As the water supply is drawn from the tank or reservoir, the float will follow the surface downward causing the trip member 6 to finally come within contact of the switch member which carries the contact point 10. This action causes these circuits F to be closed, thereby lighting the lights directly from this circuit F, which causes the light to burn most brilliantly, not having included in the circuit the resistance solenoid or coil 1. This bright illumination of the lights will indicate that the water supply in the tank is exhausted or very low, and immediately puts one on notice that a pumping or raising of the liquid surface is warranted.

As previously mentioned, a feature of the invention is to provide means for varying